Patented July 18, 1933

1,918,967

UNITED STATES PATENT OFFICE

ROBERT M. ISHAM AND OTTO SPRING, OF OKMULGEE, OKLAHOMA, ASSIGNORS TO DOHERTY RESEARCH COMPANY, OF NEW YORK, N. Y., A CORPORATION OF DELAWARE

PROCESS OF MANUFACTURING CHLORHYDRINS

No Drawing. Application filed September 24, 1931. Serial No. 564,967.

This invention relates to a process of manufacturing alkylene chlorhydrins, and particularly to a process of manufacturing ethylene chlorhydrin.

An object of the invention is to provide a simple process for the economical production of alkylene chlorhydrin from alkylene dichloride. A more particular object of the invention is to provide a process for converting ethylene dichloride to ethylene chlorhydrin without the difficulties normally encountered in the manufacture of ethylene chlorhydrin.

With the above and other objects and features in view the invention comprises essentially a process in which an alkylene dichloride is treated with a predetermined amount of sulfur trioxide at low temperature to produce chlor-alkyl-sulfuric-chloride. After separation of unreacted sulfur trioxide and alkylene dichloride, the chlor-alkyl-sulfuric-chloride formed is hydrolyzed with water, and chlorhydrin is separated from the hydrolyzed solution by distillation, or with a suitable solvent such as ethylene dichloride.

In the following description the invention will be described as applied to the manufacture of ethylene chlorhydrin from ethylene dichloride. Ethylene dichloride for use in the process may be made by contact chlorination of gaseous ethylene at a controlled low reaction temperature, followed by neutralization of any hydrochloric acid impurity and drying and purification by contact with 66° sulfuric acid, with subsequent gravity separation. Neutralization of the ethylene dichloride may be effected by steam distillation. The neutralized and dried ethylene dichloride is introduced into a mixing vessel and a definite molecular amount of sulfur trioxide is added with constant agitation of the mixture. The mixer is preferably provided with coils through which a liquid cooling or heating medium may be passed to regulate the temperature maintained therein.

The proportions of ethylene dichloride and sulfur trioxide which are reacted may be varied over a considerable range. We prefer to react substantially equimolecular proportions of ethylene dichloride and sulfur trioxide, and we have found that a molecular excess of ethylene dichloride is to be preferred to an excess of sulfur trioxide because the use of ethylene dichloride in molecular proportions or in excess gives the best yields of chlor-ethyl-sulfuric-chloride with the least amount of undesirable side reactions and loss of ethylene dichloride.

The optimum reaction temperature for ethylene dichloride and sulfur trioxide lies within the range 35-45° C., and it is desirable to maintain this temperature until chemical equilibrium is established. The ethylene dichloride should be kept cold, i. e. at a temperature of 5-10° C., during the addition of the sulfur trioxide, after which the temperature of the reaction mixture can be raised to about 40° C. To aid in maintaining this low temperature, the sulfur trioxide may be cooled to just above its solidification point prior to being added to the ethylene dichloride. In order to allow for the mixing of another batch of ethylene dichloride and sulfur trioxide, the original reaction mass may be removed prior to completion of the reaction into a second reaction vessel, where the reaction is allowed to continue under controlled temperature. This second reaction vessel may be designed to function also as a vacuum still wherein the chlor-ethyl-sulfuric-chloride is concentrated and separated from a large proportion of the unreacted ethylene dichloride and sulfur trioxide. The maximum rate of production of chlor-ethyl-sulfuric-chloride takes place in the first few hours of reaction, but the production is gradually increased by standing over a period of several days. Experience indicates that the rate of production of this product can be considerably increased by vacuum concentration with reflux reaction between the unreacted ethylene dichloride and sulfur trioxide as these products are driven off during the distillation concentration of the chlor-ethyl-sulfuric-chloride.

The chlor-ethyl-sulfuric-chloride which is drawn off from the bottom of the concentration still may contain some ethylene dichloride as an impurity. To effect hydrolysis, the crude chlor-ethyl-sulfuric-chloride is introduced into water maintained at a temperature near the freezing point of water, and the temperature of the water is then gradually raised to substantially the boiling point. Hydrolysis may also be effected by very gradually adding the chlor-ethyl-sulfuric-chloride to water at a temperature at which the heat of hydrolysis liberated by reaction between the sulfur trioxide and water just maintains the water at its boiling point, so that the hydrolysis will proceed as fast as chlor-ethyl-sulfuric-chloride is added. This last method of hydrolysis requires extreme precaution to avoid incomplete hydrolyzing and collection of unhydrolyzed chlor-ethyl-sulfuric-chloride at the bottom of the hydrolyzing vessel. Hydrolysis with cold water will require considerably more time than hydrolysis with hot water, but will normally yield larger volumes of ethylene chlorhydrin. To insure complete hydrolysis it is desirable to employ vigorous agitation, and a small amount of sulfuric acid should also be present.

The hydrolyzing chamber may be designed to function also as a distillation unit so that after hydrolysis is complete, the chlorhydrin may be recovered by fractional distillation. Ethylene chlorhydrin forms with water a constant boiling mixture boiling at 93–94° C., containing approximately 46% of chlorhydrin. This constant boiling mixture can be successfully dehydrated by distillation with ethylene dichloride, which carries out the water in a constant boiling mixture distilling at 72° C. Other immiscible solvents can be used for dehydration of chlorhydrin, as for example butyl acetate, always providing that the constant boiling mixture of the solvent with water boils below that of water and the chlorhydrin.

If it is desired to produce glycol or ethylene oxide instead of anhydrous chlorhydrin, the azeotropic mixture of chlorhydrin and water may be diluted with water and hydrolyzed with dilute 15% sodium hydroxide or sodium bicarbonate. Ethylene glycol can then be recovered from the hydrolyzed solution by extraction with a suitable solvent, or by precipitation of salt by addition of alcohol, and recovery of glycol from the alcoholic solution by distillation.

To produce propylene chlorhydrin it is desirable to maintain the reaction temperature below 0° C. while adding the sulfur trioxide to the propylene dichloride. Likewise hydrolysis of the chlor-propyl-sulfuric-chloride should be effected with cold water. Similar low temperatures are desirable in treating butylene dichloride and other alkylene dichlorides.

Selecting ethylene as a specific example, the reactions involved in the process of this invention for making chlorhydrins and glycols may be represented as follows:

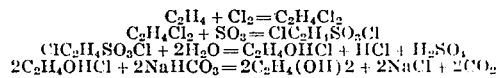

Having thus described the invention, what is claimed as new is:

1. The process of making an alkylene chlorhydrin which comprises treating an alkylene dichloride with sulfur trioxide at a controlled low temperature below 45° C., subsequently hydrolyzing the chlor-alkyl-sulfuric-chloride thus produced, and separating a constant boiling chlorhydrin-water mixture from the product of the hydrolysis.

2. The process of making alkylene halihydrins which comprises reacting an excess of an alkylene dihalide with sulfur trioxide at a controlled low temperature below 45° C. for a period of time sufficient to obtain chemical equilibrium, separating and hydrolyzing the resultant hali-alkyl-sulfuric-halide and thereby obtaining an acid mixture containing halihydrin, and recovering an azeotropic solution of the halihydrin from said acid mixture by distillation.

3. The process of making an alkylene chlorhydrin which comprises subjecting an alkylene dichloride to low temperature reaction with sulfur trioxide and thereby forming chlor-alkyl-sulfuric-chloride, hydrolyzing the latter compound with water, and separating alkylene chlorhydrin formed from water and other impurities.

4. The process of manufacturing ethylene chlorhydrin which comprises reacting ethylene dichloride with sulfur trioxide over an extended period of time at about 40–45° C., hydrolizing chlor-ethyl-sulfuric-chloride thus formed with water and thereby producing ethylene chlorhydrin, and separating a constant boiling mixture of ethylene chlorhydrin from the hydrolysis solution by fractional distillation.

5. The process of manufacturing alkylene halihydrin which comprises reacting alkylene dihalide with sulfur trioxide at a low temperature, and subsequently hydrolyzing hali-alkyl-sulfuric-halide thus formed with water and thereby forming alkylene halihydrin.

6. The process of making ethylene chlorhydrin which comprises contacting a molecular excess of ethylene dichloride with sulfur trioxide at a temperature of approximately 20–40° C. and thereby forming chlor-ethyl-sulfuric-chloride, and hydrolyzing chlor-ethyl-sulfuric-chloride thus formed with water and thereby forming ethylene chlorhydrin.

OTTO SPRING.
ROBERT M. ISHAM.